United States Patent
Stille et al.

(10) Patent No.: US 8,295,207 B2
(45) Date of Patent: Oct. 23, 2012

(54) GROUP CALL CAPABILITY QUERY

(75) Inventors: Mats Ola Stille, Bromma (SE); Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1095 days.

(21) Appl. No.: 12/118,479

(22) Filed: May 9, 2008

(65) Prior Publication Data

US 2008/0279119 A1    Nov. 13, 2008

Related U.S. Application Data

(60) Provisional application No. 60/917,337, filed on May 11, 2007.

(51) Int. Cl.
*H04L 12/16* (2006.01)
*H04Q 11/00* (2006.01)

(52) U.S. Cl. .................. 370/261; 455/416
(58) Field of Classification Search .................. None
See application file for complete search history.

(56) References Cited

U.S. PATENT DOCUMENTS

| | | |
|---|---|---|
| 2003/0017836 A1* | 1/2003 | Vishwanathan et al. ...... 455/517 |
| 2003/0125032 A1* | 7/2003 | Collins ............................ 455/450 |
| 2005/0286473 A1* | 12/2005 | Stubbs ............................ 370/331 |
| 2006/0293073 A1* | 12/2006 | Rengaraju et al. ............ 455/518 |

* cited by examiner

*Primary Examiner* — Chirag Shah
*Assistant Examiner* — Minh-Trang Nguyen

(57) ABSTRACT

A system and method for handling multimedia conference calls in a telecommunication network. To determine the capabilities of the other terminals in a group, a first terminal sends a query message to a group server. The group server sends further query messages to the other terminals and collects their responses containing their capabilities. The group server analyzes the capabilities to determine a common set of capabilities. The group server then sends the common set of capabilities in a response to the first terminal.

12 Claims, 3 Drawing Sheets

GROUP CALL CAPABILITY QUERY

CROSS-REFERENCE TO RELATED APPLICATIONS

This application claims the benefit of U.S. Provisional Application No. 60/917,337, filed May 11, 2007, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to a system and a method for handling multimedia conference calls in a telecommunication network.

Multimedia conferencing in telecommunication networks has been the subject of standardization efforts in a number of standardization organizations. For packet-based networks, ITU-T has produced a number of recommendations for multimedia communication under the umbrella recommendation H.323. The H.323 recommendation refers to a number of other recommendations such as the H.225.0 protocol that describes call signaling, media (audio and video), stream packetization, media stream synchronization, and control message formats, and the recommendation H.450 that describes supplementary services. Another signaling protocol is the Session Initiation Protocol (SIP) that has been specified by the IETF in the specification RFC 3261. RFC 3261 specifies a number of SIP messages, which carry the Session Description Protocol (SDP) specified in RFC 2327.

Currently, initiatives within the telecommunication community such as the Third Generation Partnership Project (3GPP) and 3GPP2 are specifying a next generation of packet switched core networks for telecommunication services. In 3GPP, a core network domain is called the IP Multimedia Subsystem (IMS). 3GPP is currently drafting requirements (e.g. 3GPP TS 22.173) including the support of a number of supplementary services in IMS. One example of a supplementary service is the multimedia conference (or a group call) where a plurality of multimedia terminals can be involved and where each terminal can support different media types. Media types are normally specified according the MIME standard (RFC 2046).

In addition, the Open Mobile Alliance (OMA) has defined standards for Push-to-Talk over Cellular (PoC). See, for example, Push to Talk over Cellular (PoC)—Architecture, draft version 2.0—March 2007, Open Mobile Alliance, OMA-AD_PoC-V2_0-20070326-D, which is incorporated herein by reference. The OMA PoC specifications set utilize a number of existing specifications from IETF, 3GPP, and 3GPP2, including the capabilities of the 3GPP IMS and 3GPP2 Multimedia Domain (MMD) to enable IP connectivity and IP based communication between mobile devices including multi-party conferencing.

In telecommunication systems such as IMS where calls are established and controlled by using SIP signaling, the SIP method called OPTIONS (described in IETF RFC 3261) may be utilized to determine a remote terminal's capabilities. The OPTIONS method enables a user terminal to query another user terminal or a proxy server as to its capabilities. This enables a client to discover information about the supported methods, content types, extensions, codecs, and the like without "ringing" the other party. The OPTIONS response is a so-called "200 OK" message with attached SDP, which describes the media support of the remote end. The 200 OK response message may also include feature tags showing other capabilities that could be of use to the sender of the OPTIONS request.

SUMMARY

A limitation with the current OPTIONS method in SIP is that there can only be one OPTIONS response for each OPTIONS request. In multimedia conferences, this becomes a problem because the users want to know what all of the conference participants commonly support. A conference call involving for example five participants cannot return four OPTIONS responses to the single OPTIONS request sent by one participant.

An embodiment of the present invention solves this problem by implementing a method using a server located between the involved user terminals (clients). The server collects the supported capabilities (such as media types, supplementary services, and the like) of each of the participant's user terminal and aggregates the common set of supported capabilities and return those in a single response message (such as a 200 OK response) which then represents the support of the conference.

One service enquiry message (e.g. an OPTIONS request) with a group call context is sent to a group call server. The server sends one service enquiry message (e.g. an OPTIONS request) to each participant and awaits their response (e.g., in a 200 OK response). After that, the server analyzes the commonly supported capabilities received from each participant terminal. The server may optionally analyze any system policy, group policy, and subscriber policy that may forbid a certain support although the terminal supports it due to non-subscribed capability. After analyzing all these parameters, the server forms a collective 200 OK response including an SDP description about the supported capabilities. The server may decide as one policy to include a capability such as video as a possibility in the call if 75% of the participants support video.

The service enquiry message (such as the OPTIONS request) can be sent during an ongoing conference call or without relation to any ongoing call.

An advantage with this solution is that conference calls can be established by knowing in advance what capabilities the other user terminals can support. A multitude of trial and error call setups is therefore not necessary.

Another advantage is that the capabilities available for each involved terminal in the conference call can be presented to the user in a user-friendly way on the terminal. For example, a mobile phone with a display could present icons representing the capabilities for each terminal involved. This makes the conference service more attractive to the user and, in the end, encourages the user to generate more traffic in the network which is a benefit for the network operator.

Yet another advantage is that the present invention can be expanded with new shared multimedia services as they enter the market.

The objective of the present invention is therefore to simplify communication between multimedia terminals in a multimedia conference call.

BRIEF DESCRIPTION OF THE SEVERAL VIEWS OF THE DRAWING

The invention will now be described in more detail and with preferred embodiments and referring to accompanying drawings, in which.

DETAILED DESCRIPTION OF THE INVENTION

Figure 1:
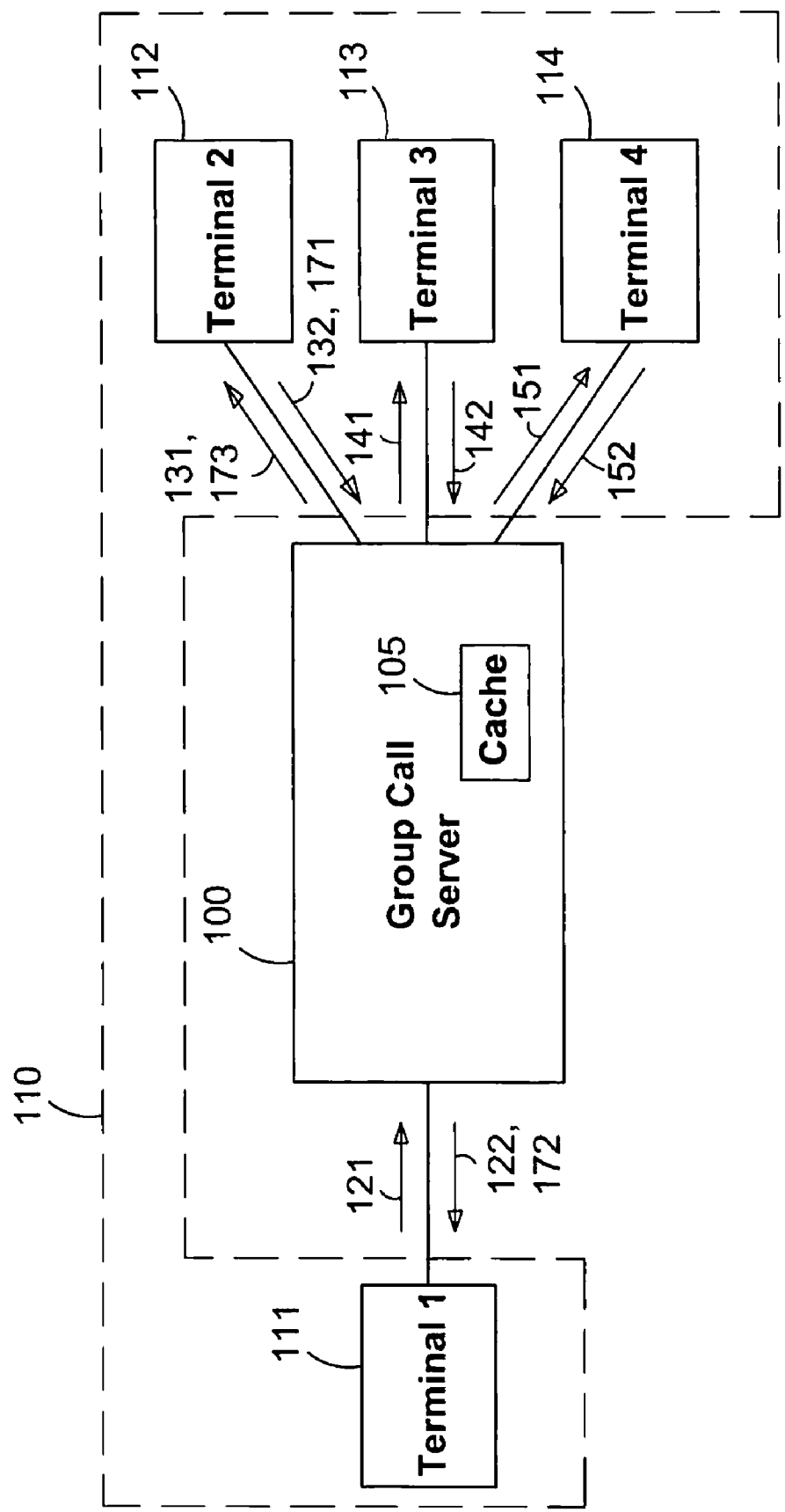
FIG. 1 is a simplified block diagram showing a group of terminals that can access a group call server according to the present invention.

FIG. 1 is a block diagram showing a group 110 of terminals 111-114 that can access a group call server 100 according to the present invention. The group call server is adapted to receive SIP OPTIONS requests 121 from a terminal 111 in the group 110. The group call server is further adapted to broadcast a SIP option request 131,141,151 to a plurality of other terminals 112-114 in the group 110.

The group call server 100 includes a memory area (a cache) 105 adapted to store capabilities of involved terminals 112-114 in the group 110.

FIG. 1 also illustrates the information flow between the terminals 111-114 in the group 110 and the group call server 100:

1) Terminal 1 111 sends a SIP OPTIONS request 121 within the ongoing SIP session. The SIP OPTIONS request 121 is addressed to the group call server 100.

2) The group call server 100 sends a SIP OPTIONS request 131 to terminal 2 112.

3) The group call server 100 sends a SIP OPTIONS request 141 to terminal 3 113.

4) The group call server 100 sends a SIP OPTIONS request 151 to terminal 4 114.

5) The group call server 100 receives a SIP 200 OK response 132 from terminal 2 112 indicating, for example, that it supports m=audio, m=video, m=messaging.

6) The group call server 100 receives a SIP 200 OK response 142 from terminal 3 113 indicating, for example, that it supports m=audio, m=video.

7) The group call server 100 receives a SIP 200 OK response 152 from terminal 4 114 indicating, for example, that it supports m=audio, m=video, m=messaging.

8) The group call server 100 checks any system, group, or subscriber policy that may restrict terminal 1, for example, from using video although all participant devices support it. The group server 100 then creates a common SIP 200 OK response 122 to terminal 1 with a common set of capabilities. In the example above, the SIP 200 OK response would contain an SDP with m=audio and m=video because terminal 3 did not support messaging although terminal 2 and terminal 4 did.

9) When terminal 1 receives the 200 OK response 122, terminal 1 analyses the attached SDP. If terminal 1 has a display, icons such as 'add video' for example may be highlighted as a soft button on the display. Pressing that button leads to video streaming to terminals 2-4.

This exemplary method provides a way for terminal 1 111 to learn the capability of all other terminals 112-114 involved in the conference call.

In order to save signaling, the group call server 100 can optionally store the responses 132,142,152 from each terminal 112-114 in the memory area 105. When another terminal sends an SIP OPTION request, i.e. if terminal 2 112 in the configuration in FIG. 1 sends an SIP OPTIONS request 171, the group call server only sends a SIP OPTIONS request 172 to terminal 1 111 because the content from the SIP 200 OK response 142 from terminal 3 113 and the SIP 200 OK response 152 from terminal 4 114 is already known by the server before sending the SIP 200 OK response 173 to the terminal 2 112.

Figure 2:
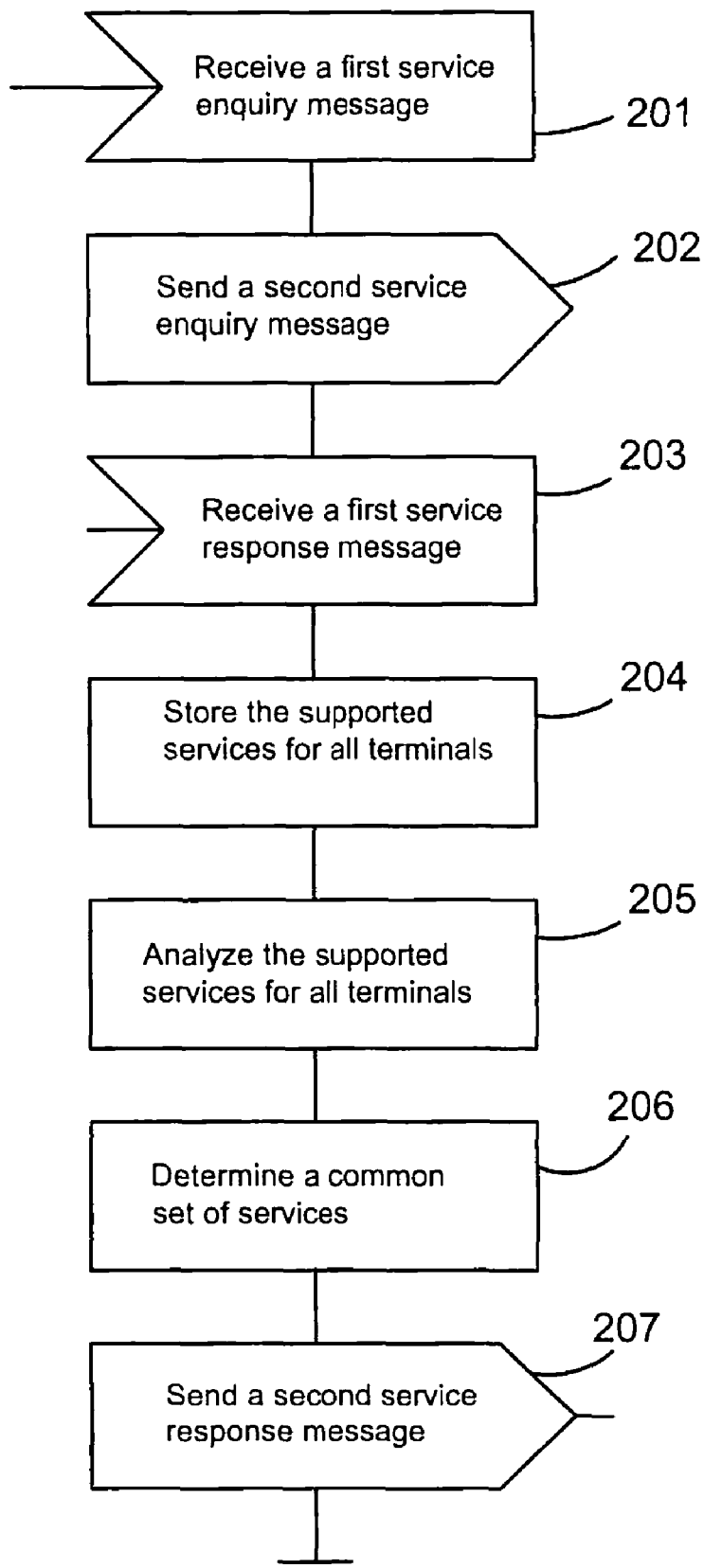
FIG. 2 is a flow chart showing the steps of determining the capabilities supported by multimedia terminals according to the method in the present invention.

FIG. 2 is a flow chart illustrating the steps of an embodiment of the method of the present invention as performed in the group call server 100. In step 201, the group call server receives a first service enquiry message 121 (such as an OPTIONS request) from the terminal 111 in the group 110. In step 202, the server broadcasts a second service enquiry message (OPTIONS request) 131,141,151 to at least one of the other terminals 112-114 in the group. In step 203, the server receives a first service response message (such as a 200 OK message) 132,142,152 from each of the enquired terminals 112-114. Optionally, the server stores all received service response messages from the terminals in the memory cache 105. In step 205, the server analyzes the content in the received service response messages 132,142,152 and determines, in step 206, a common set of services. This common set of services is then sent in step 207 to terminal 111 in a service response message (200 OK message).

Figure 3:
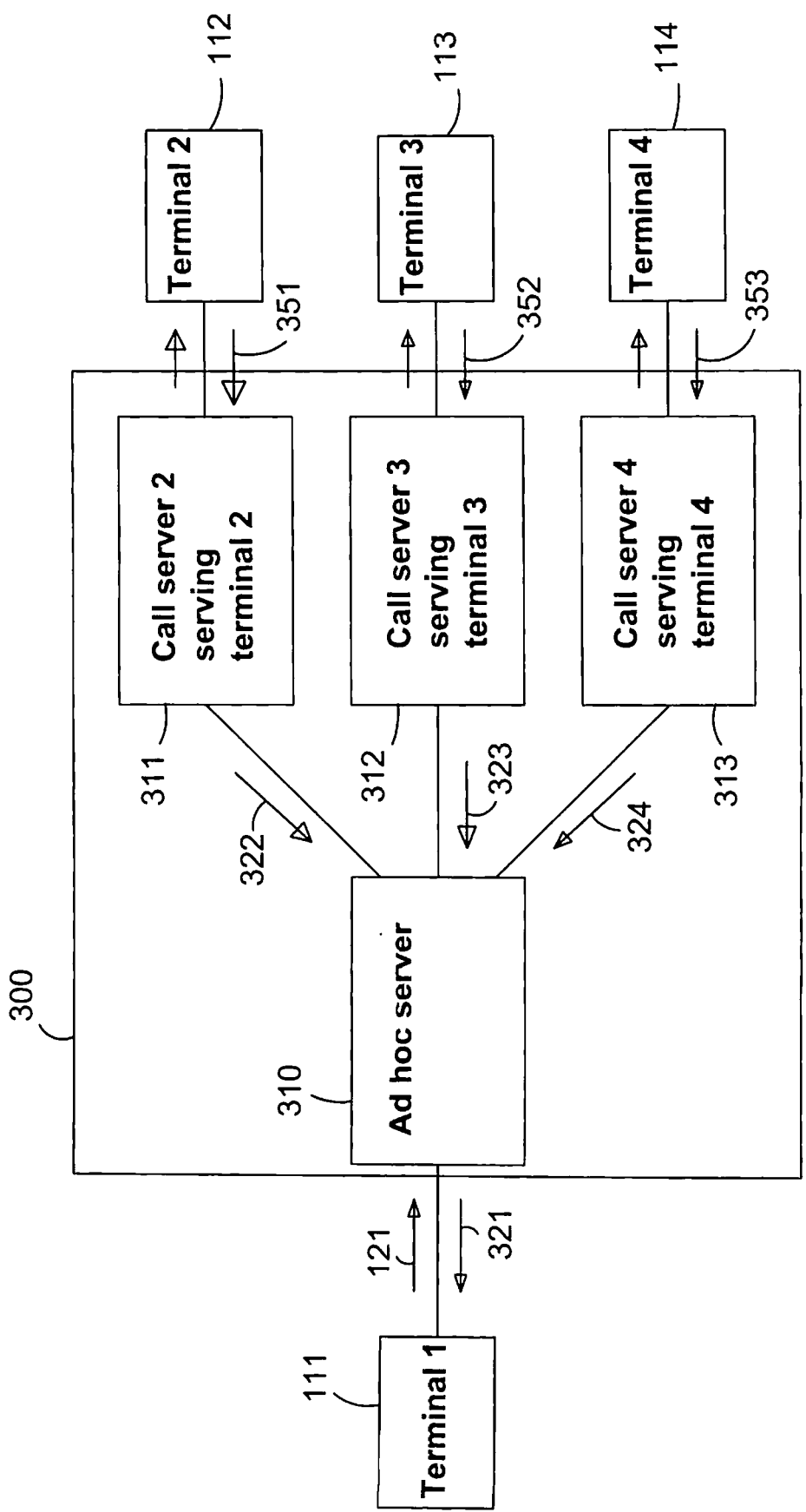
FIG. 3 is a simplified block diagram of an embodiment of a group call server that is divided into a number of sub-servers.

FIG. 3 is a simplified block diagram of an embodiment of a group call server 300 that is divided into several sub-servers depending on different applications such as, for example, 3GPP Multi-media telephone or OMA PoC. The server 300 includes an ad hoc server 310 and a number of sub-servers 311-313. The ad hoc server 310 is accessible from the terminal 111 and the sub-servers 311-313 are accessible from terminals 112-114, respectively.

FIG. 3 is an example of a multi-server configuration applicable, for example, to the MMtel (Multimedia Telephony) ad-hoc group call or a 1-1 PoC Session and Ad-hoc PoC Session. The sub-servers 311-313 serving the terminals 112-114 may modify the content of received service response messages (200 OK) 351-353 based on the served user's subscription and service provider local policy. The ad-hoc server 310 aggregates the received responses 322-324 from the sub-servers 311-313 and may apply a group policy, such as subscription options and the service providers local policies before sending a OPTIONS response 321 towards terminal 1 111.

The present invention may be applied in some embodiments to Push-to-talk over cellular (PoC). A person skilled in the art would apply the inventive concept in a number of other network scenarios, such as 3GPP multimedia telephone, MMtel ad-hoc group and the like.

Below is a detailed description of the OPTION method extracted from RFC 3261.

The SIP method OPTIONS enables a User Agent (UA) to query another UA or a proxy server as to its capabilities. This allows a client to discover information about the supported methods, content types, extensions, codecs, and the like without "ringing" the other party. For example, before a client inserts a Require header field into an INVITE listing an option that the client is not certain the destination User Agent Server (UAS) supports, the client can query the destination UAS with an OPTIONS request to see if the option is returned in a Supported header field. All UAs must support the OPTIONS method.

The target of the OPTIONS request is identified by the Request-URI, which may identify another UA or a SIP server. If the OPTIONS request is addressed to a proxy server, the Request-URI is set without a user part, similar to the way a Request-URI is set for a REGISTER request. Alternatively, a server receiving an OPTIONS request with a Max-Forwards header field value of 0 MAY respond to the request regardless of the Request-URI. This behavior is common with HTTP/1.1. This behavior can be used as a "traceroute" functionality to check the capabilities of individual hop servers by sending a series of OPTIONS requests with incremented Max-Forwards values. As is the case for general UA behavior, the transaction layer can return a timeout error if the OPTIONS yields no response. This may indicate that the target is unreachable and hence unavailable.

An OPTIONS request MAY be sent as part of an established dialog to query the peer on capabilities that may be utilized later in the dialog.

An OPTIONS request is constructed using the standard rules for a SIP request as discussed in Section 8.1.1 of RFC3261. A Contact header field MAY be present in an OPTIONS request, and an Accept header field SHOULD be included to indicate the type of message body the User Agent Client (UAC) wishes to receive in the response. Typically, this is set to a format that is used to describe the media capabilities of a UA, such as SDP (application/sdp).

The response to an OPTIONS request is assumed to be scoped to the Request-URI in the original request. However, only when an OPTIONS request is sent as part of an established dialog is it guaranteed that future requests will be received by the server that generated the OPTIONS response.

Example OPTIONS request:

```
OPTIONS sip:carol@chicago.com SIP/2.0
Via: SIP/2.0/UDP pc33.atlanta.com;branch=z9hG4bKhjhs8ass877
Max-Forwards: 70
To: <sip:carol@chicago.com>
From: Alice <sip:alice@atlanta.com>;tag=1928301774
Call-ID: a84b4c76e66710
CSeq: 63104 OPTIONS
Contact: <sip:alice@pc33.atlanta.com>
Accept: application/sdp
Content-Length: 0
```

The response to an OPTIONS request is constructed using the standard rules for a SIP response as discussed in Section 8.2.6 of RFC3261. The response code chosen must be the same that would have been chosen had the request been an INVITE. That is, a 200 (OK) would be returned if the UAS is ready to accept a call, a 486 (Busy Here) would be returned if the UAS is busy, etc. This allows an OPTIONS request to be used to determine the basic state of a UAS, which can be an indication of whether the UAS will accept an INVITE request.

An OPTIONS request received within a dialog generates a 200 (OK) response that is identical to one constructed outside a dialog and does not have any impact on the dialog. This use of OPTIONS has limitations due to the differences in proxy handling of OPTIONS and INVITE requests. While a forked INVITE can result in multiple 200 (OK) responses being returned, a forked OPTIONS will only result in a single 200 (OK) response, since it is treated by proxies using the non-INVITE handling. See Section 16.7 of RFC3261 for the normative details.

If the response to an OPTIONS is generated by a proxy server, the proxy returns a 200 (OK), listing the capabilities of the server. The response does not contain a message body.

Allow, Accept, Accept-Encoding, Accept-Language, and Supported header fields SHOULD be present in a 200 (OK) response to an OPTIONS request. If the response is generated by a proxy, the Allow header field SHOULD be omitted as it is ambiguous since a proxy is method agnostic. Contact header fields MAY be present in a 200 (OK) and have the same semantics as in a 3xx response. That is, they may list a set of alternative names and methods of reaching the user. A Warning header field MAY be present.

A message body MAY be sent, the type of which is determined by the Accept header field in the OPTIONS request (application/sdp is the default if the Accept header field is not present). If the types include one that can describe media capabilities, the UAS SHOULD include a body in the response for that purpose. Details on the construction of such a body in the case of application/sdp are described in RFC 3264.

Example OPTIONS response generated by a UAS (corresponding to the request described above):

```
SIP/2.0 200 OK
Via: SIP/2.0/UDP pc33.atlanta.com;branch=z9hG4bKhjhs8ass877
;received=192.0.2.4
To: <sip:carol@chicago.com>;tag=93810874
From: Alice <sip:alice@atlanta.com>;tag=1928301774
Call-ID: a84b4c76e66710
CSeq: 63104 OPTIONS
Contact: <sip:carol@chicago.com>
Contact: <mailto:carol@chicago.com>
Allow: INVITE, ACK, CANCEL, OPTIONS, BYE
Accept: application/sdp
Accept-Encoding: gzip
Accept-Language: en
Supported: foo
Content-Type: application/sdp
Content-Length: 274
(SDP not shown)
```

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a telecommunication network for a first multimedia terminal in a group to determine multimedia capabilities supported by a group server and a plurality of other multimedia terminals in the group, said method comprising the steps of:

receiving in the group server during an ongoing multimedia session, a first service enquiry message from the first multimedia terminal in the group, the first service enquiry message including a session identity for the ongoing multimedia session;

sending a second service enquiry message from the group server to the other multimedia terminals in the group;

receiving in the group server as a response to the second service enquiry message, a first service response message from each of the other multimedia terminals to which the second service enquiry message was sent, each of the first service response messages including capabilities of one of the other multimedia terminals;

analyzing by the group server, the received capabilities in the first service response messages to determine a common set of capabilities and to allow or forbid certain of the capabilities in the common set based on local policy in the group server and a user profile for a user of the first multimedia terminal; and sending as a response to the first service enquiry message, a second service response message from the group server to the first multimedia terminal, said second service response message including an allowed common set of capabilities.

2. The method as recited in claim 1, further comprising storing the received capabilities in the server.

3. The method as recited in claim 2, further comprising the steps of:

receiving in the group server, a third service enquiry message from a second multimedia terminal;

sending a fourth service enquiry message from the group server to the first multimedia terminal;

receiving in the group server as a response to the fourth service enquiry message, a third service response message from the first multimedia terminal, the third service response message including capabilities of the first multimedia terminal;

analyzing by the group server, the received capabilities in the third service response message together with the stored capabilities for the other multimedia terminals;

determining by the group server, a second allowed common set of capabilities; and sending as a response to the third service enquiry message, a fourth service response message from the group server to the second multimedia terminal comprising the second allowed common set of capabilities.

4. The method as recited in claim 3, wherein the service enquiry messages are SIP OPTIONS requests, and the service response messages are SIP 200 OK responses.

5. The method as recited in claim 1, wherein the ongoing multimedia session is a Push-to Talk over Cellular (PoC) conference call.

6. A multimedia application server in a telecommunication network for determining multimedia capabilities supported by a plurality of multimedia terminals constituting a group, said server being accessible from the group, said server comprising a processor coupled to a non-transitory memory storing computer program instructions, wherein when the processor executes the instructions, the server is caused to:

receive during an ongoing multimedia session, a first service enquiry message from a first multimedia terminal in the group, the first service enquiry message including a session identity for the ongoing multimedia session;

collect capabilities from other multimedia terminals in the group;

analyze the collected capabilities to determine a common set of capabilities and to allow or forbid certain of the capabilities in the common set based on local policy in the server and a user profile for a user of the first multimedia terminal; and return to the first multimedia terminal, a service response message including an allowed common set of capabilities.

7. The multimedia application server as recited in claim 6, further comprising a memory area for storing the collected capabilities.

8. The multimedia application server as recited in claim 7, wherein the server is configured to analyze the collected capabilities together with capabilities previously stored in the memory area.

9. The multimedia application server as recited in claim 6, wherein the server is configured to connect to at least one other multimedia application server.

10. A system in a telecommunication network for determining multimedia capabilities supported by a plurality of multimedia terminals constituting a group, said system comprising:

a plurality of multimedia application servers in communication with each other, said servers being accessible from the group of multimedia terminals, each of said servers comprising a processor coupled to a non-transitory memory storing computer program instructions, wherein when the processor executes the instructions, the server is caused to:

receive during an ongoing multimedia session, a first service enquiry message from a first multimedia terminal in the group, the first service enquiry message including a session identity for the ongoing multimedia session;

collect capabilities from other multimedia terminals in the group;

analyze the collected capabilities to determine a common set of capabilities and to allow or forbid certain of the capabilities in the common set based on local policy in the server and a user profile for a user of the first multimedia terminal; and return to the first multimedia terminal, a service response message including an allowed common set of capabilities.

11. The system as recited in claim 10, wherein the servers are connected to each other in a configuration depending on an application.

12. The system as recited in claim 11, wherein one server is an ad hoc server, and the other servers are sub-servers connected to the ad hoc server, wherein the ad hoc server is configured to aggregate service response messages received from the sub-servers.

* * * * *